United States Patent [19]

Ng

[11] Patent Number: 5,205,116
[45] Date of Patent: Apr. 27, 1993

[54] COMPRESSOR STALL RECOVERY APPARATUS

[75] Inventor: Thomas V. Ng, West Chester, Ohio

[73] Assignee: General Electric Company, Cincinnati, Ohio

[21] Appl. No.: 950,541

[22] Filed: Sep. 25, 1992

Related U.S. Application Data

[62] Division of Ser. No. 732,895, Jul. 19, 1991.

[51] Int. Cl.⁵ .............................................. F02C 9/28
[52] U.S. Cl. .................................................. 60/39.281
[58] Field of Search ............... 60/39.27, 39.281, 739, 60/740, 741

[56] References Cited

U.S. PATENT DOCUMENTS

| | | | |
|---|---|---|---|
| 3,335,567 | 8/1967 | Hemsworth | 60/39.74 |
| 4,027,473 | 6/1977 | Baker | 60/39.28 R |
| 4,128,995 | 12/1978 | Toot | 60/204 |
| 4,186,556 | 2/1980 | Lowry et al. | 60/39.03 |
| 4,722,180 | 2/1988 | Lindler et al. | 60/39.03 |
| 4,825,639 | 5/1989 | Krukoski | 60/39.03 |
| 4,825,649 | 5/1989 | Donnelly et al. | 60/261 |
| 4,903,478 | 2/1990 | Seto et al. | 60/39.281 |

FOREIGN PATENT DOCUMENTS 2239056A  6/1991  United Kingdom .

Primary Examiner—Louis J. Casaregola
Attorney, Agent, or Firm—Jerome C. Squillaro; John R. Rafter

[57] ABSTRACT

A compressor stall recovery apparatus and method senses a compressor stall condition and cuts off the supply of fuel to selected ones of the nozzles of the combustor until after the stall condition has abated.

7 Claims, 3 Drawing Sheets

COMPRESSOR STALL RECOVERY APPARATUS

This is a division of application Ser. No. 732,895, filed Jul. 19, 1991.

BACKGROUND OF THE INVENTION

1. Field of the Invention

The present invention relates generally to gas turbine engines and, more specifically, to an aircraft gas turbine engine having improved compressor stall recovery capabilities.

2. Description of the Related Art

A typical aircraft jet engine includes a compressor, a combustor, and a turbine. The compressor is rated according to its pressure ratio and mass airflow. As with any airfoil device, effectiveness gradually increases up to an optimum point followed by a rapid decay known as stall or surge. In the design of high performance engines, there is usually a fine line between optimum performance and stall.

Each stage of a compressor increases the pressure until the air leaves the compressor at a significantly higher pressure than it had upon entering the compressor. If compressor rpm is constant and compressor airflow is decreased, the airflow vector becomes shorter and the angle of attack is increased. If the airflow is constant and the rpm is increased, the angle of attach will be increased. An airfoil stalls and lift is lost when maximum design angle of attack is exceeded. One or more compressor blades and possibly the entire compressor could stall under such conditions.

To increase the stall margin when operating under conditions other than the compressor design speed, the inlet guide vanes and multiple stages of the stator vanes are made variable. The angular position and the resultant air deflection are a function of compressor inlet temperature (CIT) and engine speed. Vane angular position is controlled automatically through the main fuel control or engine control system.

Generally speaking, if the air within the compressor reaches an unstable condition, a stall might result. A stall condition can be sensed and indicated by the engine control system, or the manifestations of the condition can be observed, such as a rapid exhaust gas temperature (EGT) increase fluctuation, rpm fluctuation, engine pressure ratio (EPR) decrease or fluctuation, vibration caused by compressor pulsation and poor engine response to throttle movements. More severed compressor stalls can cause very loud noises and may be accompanied by flame, vapor or smoke at the engine exhaust and/or inlet.

Compressor stalls generally result in potentially damaging increases in EGT. Since excessive temperatures shorten the life of engine parts, it is desirable to implement stall recoveries as soon after detection is possible.

One recovery technique is to use compressor bleed valves to relieve air from the compressor. Bleeding of the compressor decreases the airflow across the rear stages and increases the flow across the forward stages. This deters choking of the rear stages and stalling of the forward stages.

Compressor bleed may avoid stalling but the penalty for doing so is a loss of thrust in that the effective pressure ratio of the compressor during the time the valves are open is reduced. U.S. Pat. No. 4,186,556 describes a technique of increasing the stall margin by monitoring the amount of air that is bled off from a compressor and then biasing the acceleration schedule in accordance with the amount of bleed air.

Typically, a combustor will have a plurality of fuel nozzles disposed at equidistantly spaced intervals around the annular combustor. The nozzles are interconnected to a manifold which is fed with fuel from a fuel line connected to a fuel pump.

Another technique for implementing stall recovery is to cut back the supply of fuel to the combustor section, either by use of the throttle or an intervening flow control device independent of the throttle. For example, in U.S. Pat. No. 4,768,338, a surge condition recovery technique includes cutting back fuel to the combustor upon detection of a surge. Stall recovery results from the removal of back pressure as a result of less fuel consumption. The back pressure is uniformly distributed around the annularly shaped combustor. Typically, a combustor will have a plurality of fuel nozzles disposed at equidistantly spaced intervals around the annular combustor. The nozzles are interconnected to a manifold which is fed with fuel from a fuel line connected to a fuel pump.

Another example of fuel flow rate control is found in U.S. Pat. No. 4,722,180, wherein the fuel delivery rate is controlled by a valve disposed in the fuel line between the manifold and the pump.

With a system that relies on either a reduction in fuel delivery to the combustor, or an increase in the amount of air bled from the combustor, a concomitant reduction in thrust will result. Thus, a need exists for a compressor stall recovery method and apparatus which does not rely on a total or partial reduction in fuel flow, to effect a compression stall recovery.

SUMMARY OF THE INVENTION

An object of the present invention is therefore to provide a compressor stall recovery method and apparatus which does not rely on a total or partial reduction in fuel flow.

Another object of the present invention is to provide a compressor stall recovery method and apparatus that does not require an increased amount of bleed air from the compressor.

Another object of the present invention is to provide a compressor stall recovery method and apparatus which is relatively simple to implement, without the need for increased programming, controlling, etc. such as would be necessary to alter the acceleration schedule or fuel/air ratio.

These and other objects of the invention are met by providing a compressor stall recovery apparatus for a gas turbine engine having a combustor downstream of the compressor, the combustor having a plurality of fuel nozzles fed with fuel, the fuel nozzles being disposed in an annular array around an axis of the gas turbine engine, the apparatus including means for detecting a compressor stall condition, valve means for controlling the flow of fuel to selected ones of the plurality of nozzles; and control means connected to the valve means for actuating the valve means when the detecting means detects a compressor shall condition so as to cut off the flow of fuel to the selected ones of the plurality of nozzles until the detecting means detects that the compressor stall condition has abated.

A method according to the present invention includes detecting a compressor stall condition and shutting off fuel to selected ones of the plurality of fuel nozzles, so that the nozzles are staged until stall recovery is accomplished. Staging of the combustor fuel nozzles provides enough drop in compressor discharge pressure to allow stall recovery of the compressor.

These and other features and advantages of the compressor stall recovery apparatus and method will becomes more apparent with reference to the following detailed description and drawings.

DETAILED DESCRIPTION OF THE PREFERRED EMBODIMENTS

Figure 1:
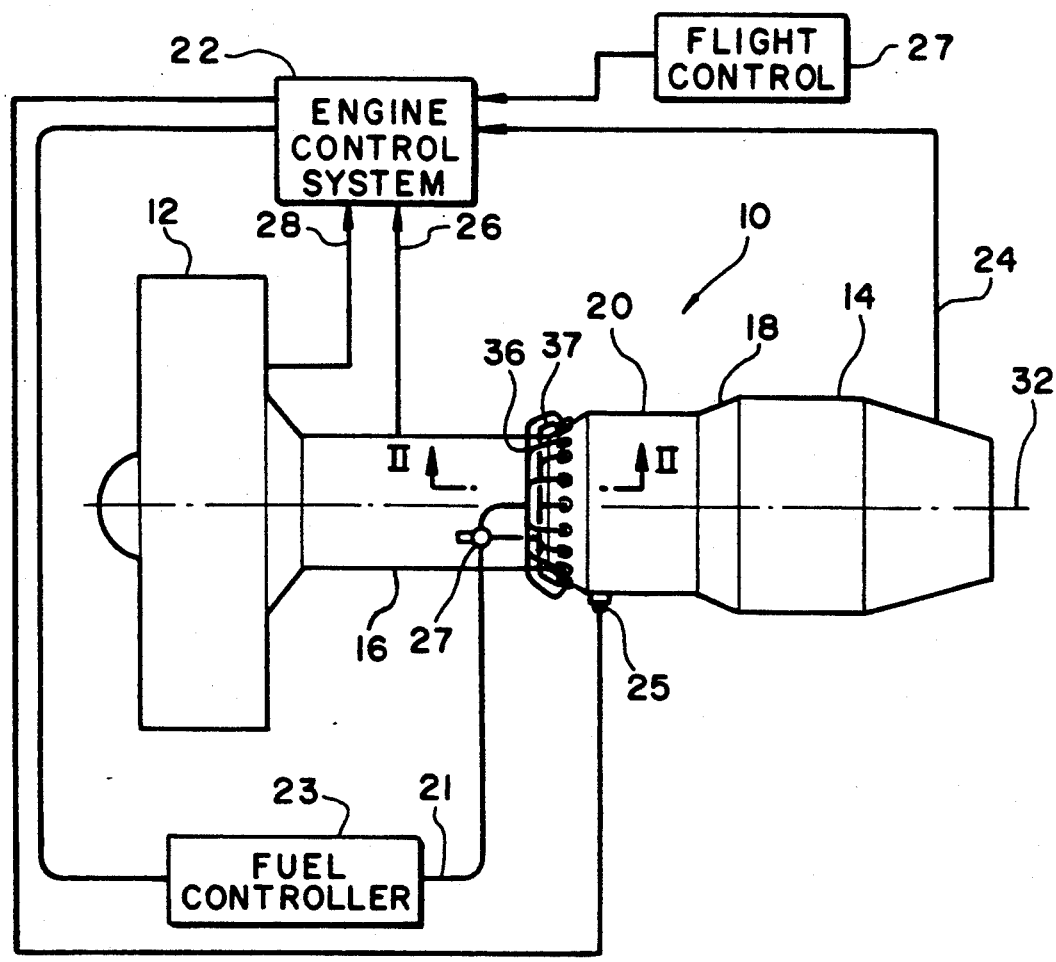
FIG. 1 is a schematic plan view of an aircraft gas turbine engine adapted to employ the method and apparatus of the present invention.
Figure 2:
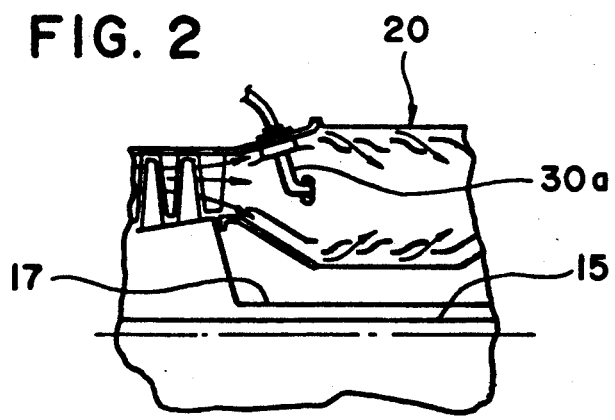
FIG. 2 is a partial sectional view through the combustor section of the gas turbine engine of FIG. 1, taken along line II—II of FIG. 1.

Referring now to FIGS. 1 and 2, a gas turbine engine is generally referred to by the numeral 10 and includes a low pressure compressor section 12, a low pressure turbine section 14 connected to the low pressure compressor section 12 through a shaft 15, a high pressure compressor section 16 and a high pressure turbine section 18 interconnected to the high pressure compressor through a second, coaxial shaft 17. A combustor section 20 is interposed between the rear-most stage of the high pressure compressor section 16 and the first stage of the high pressure turbine section 18. The general flow of compressed air into the combustor 20 is indicated by direction arrows in FIG. 2.

A plurality of engine operating parameters are fed as signals to an engine control system 22 which outputs control signals and regulates the fuel flow through the combustor 20 so as to govern engine speed, control acceleration and deceleration rates, and compensate for altitude, compressor inlet temperature and compressor discharge pressure variations, etc. The engine control system 22 functions to control various operating units such as a fuel controller 23 and igniter plug 25 after flight control information (throttle position, etc.) is input by the operator at a flight control station 27. Control signals are determined in response to a plurality of operating signals 24, 26 and 28 which provide indications of various operating conditions such as compressor inlet temperature, core engine speed, compressor discharge pressure, power demand input, etc. Additional input signals may be provided to the engine control system 22 or alternative signals may also be used. For example, it is common to provide a signal representative of the turbine gas temperature so as to limit the fuel flow to prevent excessive temperatures of the turbine. Also, as an alternative to sensing the core engine speed, the fan speed may instead by sensed and the representative signal applied to the fuel control system.

One or more of these signals can be used to indicate a stall condition. Thus, the engine control system 22 may include a controller which compares various input signals to predetermined values in order that a stall condition can be detected and indicated.

The present invention involves methodology and structure for implementing a compressor stall recovery once it has been determined that a stall condition exists.

Figure 3:
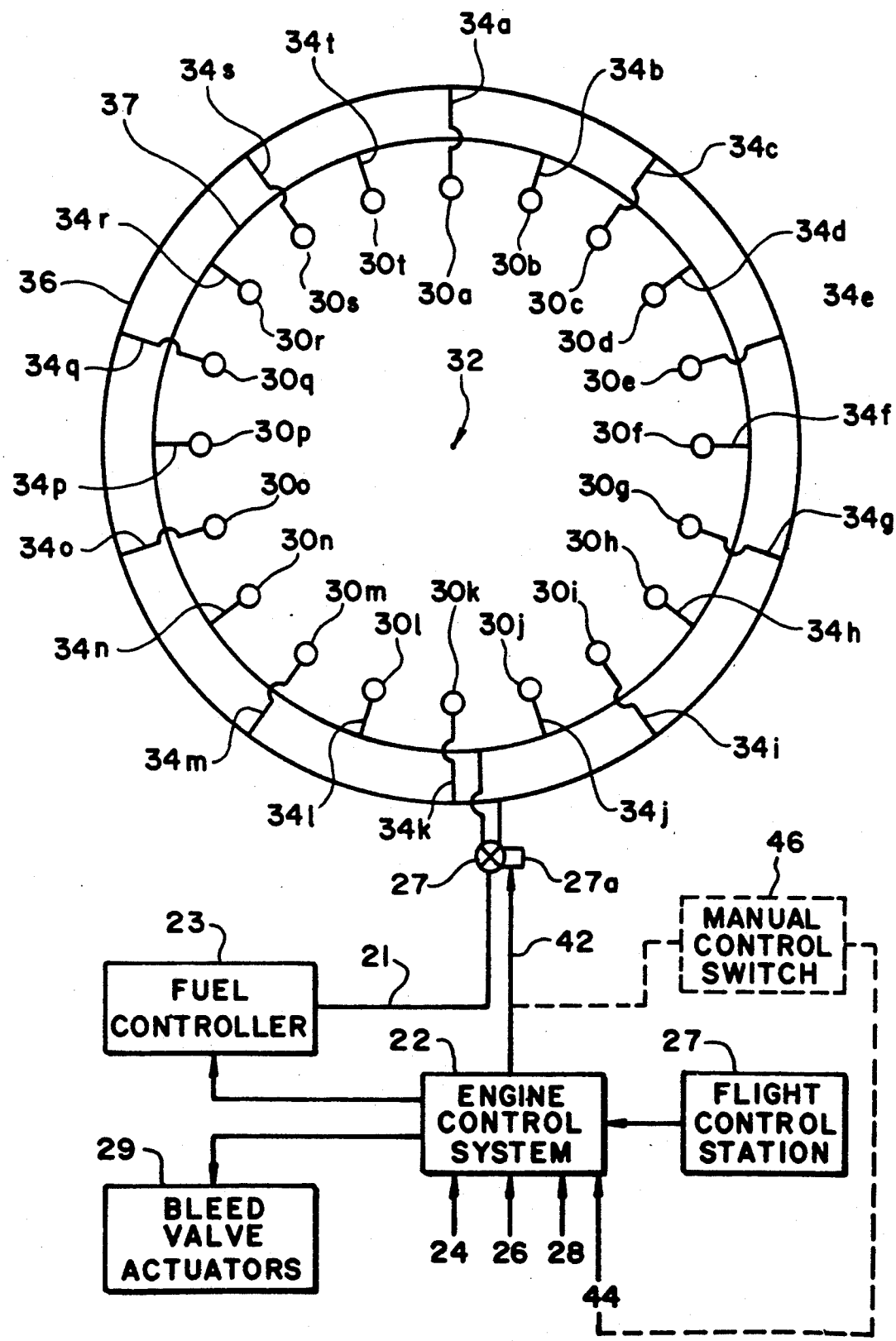
FIG. 3 is a schematic end view of the apparatus according to the present invention.

The present invention invokes stall recovery by staging of the fuel nozzles. Referring to FIGS. 1 and 3, a plurality of nozzles 30a through 30t are disposed in an annular array around a center axis 32 of the engine. A first manifold 36 feeds fuel to selected ones of the nozzles through corresponding fuel lines 34a, 35c, 34e, 34g, 34i, 34k, 34m, 34o, 34q, and 34s. The remaining nozzles are interconnected through a second manifold 37 through fuel lines 34b, 34d, 34f, 34h, 34j, 34l, 34n, 34p, 34r, and 34t.

The two manifolds are normally supplied with fuel from a fuel line 21 of a fuel controller 23. A valve 27 provides a Y-coupling of the two manifolds 36 and 37 to the fuel line 21. Thus, the valve 27 normally maintains a flow of fuel to both manifolds 36 and 37.

In the event that a stall condition is detected by the engine control system, or other suitable means, a control signal is delivered to a valve actuator 27a so as to move the valve 27 to an operable position whereby one of the two manifolds 36 and 37 is cut off from the fuel line 21. Thus, according to the embodiment illustrated in FIG. 3, every other one of the nozzles will be cut off from the supply of fuel.

Figure 4:
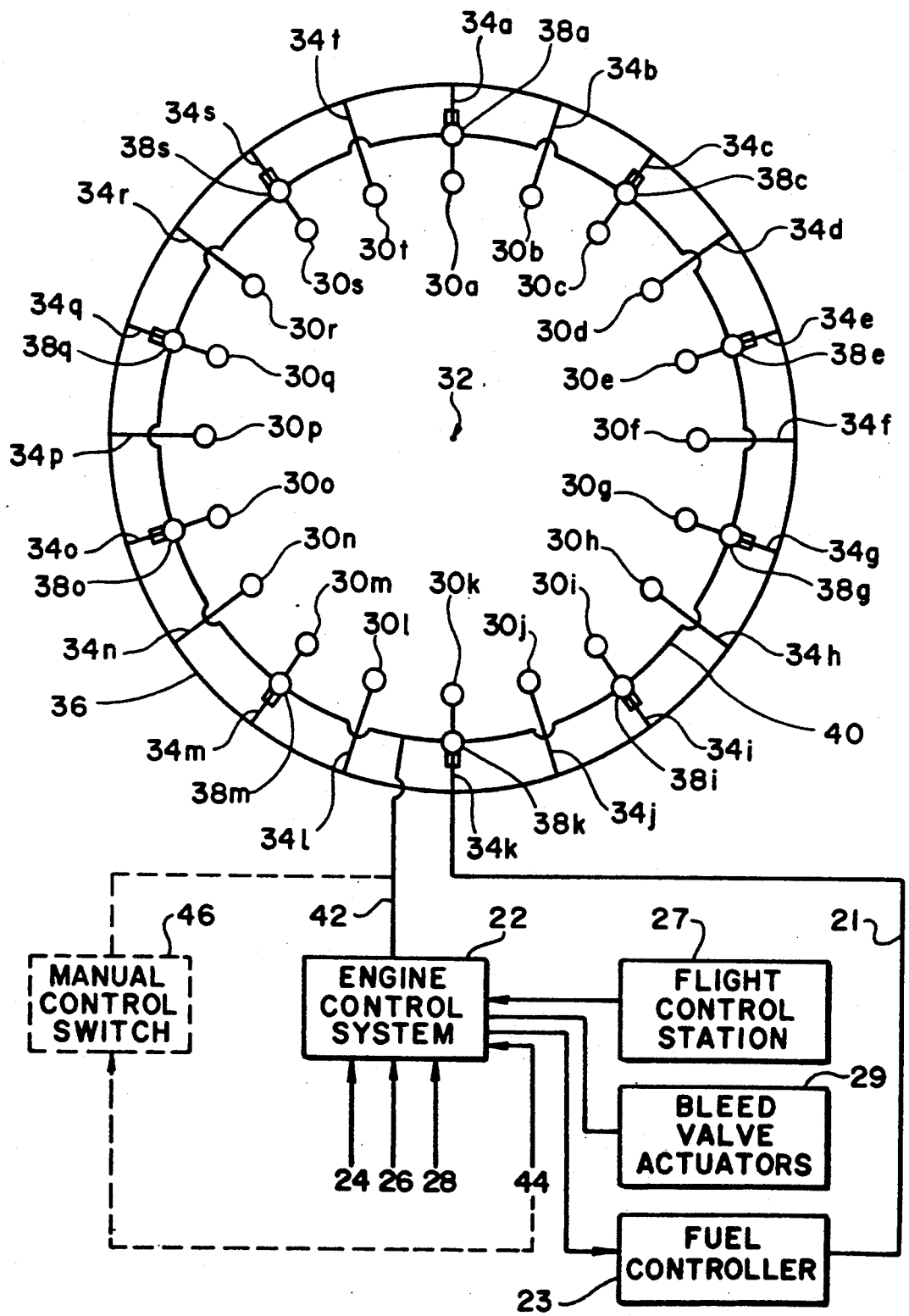
FIG. 4 is a schematic end view of another embodiment of the apparatus according to the present invention.

In an alternative embodiment, illustrated in FIG. 4, each nozzle 30a through 30t is provided with a fuel line 34a through 34t, all of which are interconnected through a single manifold 36. The manifold 36 distributes the fuel supplied under pressure by a fuel pump (not shown) to each of the nozzles 30a through 30t. A plurality of valves 38a, 38c, 38e, 38g, 38i, 38k, 38m, 38o, 38q, and 38s are disposed in the fuel lines of every other nozzle between the manifold 36 and the respective nozzles. The valves are normally in an open position and are selectively actuated upon the occurrence of a stall condition to move to the closed position. Any appropriate valve actuators, such as fluid pressure or solenoid actuators illustrated schematically on each valve in FIG. 4 can be used. The valve actuators of all of the valves can be interconnected through a common line 40 so as to be simultaneously actuated to the closed position upon receiving a control signal from the engine control system 22.

In either embodiment, when the engine control system is capable of determining a stall condition, an output signal 42 is provided to cause the valve or valves to close. When closed, the supply of fuel delivered to the combustor is not affected, even though every other nozzle in the combustor will be shut down. In either embodiment, fuel flow to the operating nozzles will be increased. Thus, after a stall condition is sensed by the fuel control system, the combustor fuel nozzles are staged until stall recovery has been accomplished. Staging of the combustor fuel nozzles provides a sufficient drop in compressor discharge pressure to allow stall recovery of the compressor.

In addition to the signals 24, 26 and 28, a separate stall indication signal 44 may be provided to the engine control system 22 from other means. Stall indicators of virtually any known variety can be used. With the stall indication signal provided to the engine control system 22 the closing of the valve or valves can be effected automatically with the output control signal 42. Alternatively, a manual control switch 46 can be provided to give the command signal 42 by virtue of operator observation of the stall indication signal 44 (if provided as an indicator light in the cockpit, for example), or recognition of other manifestations of a stall condition.

Staging the nozzles as described above may be accompanied by other known techniques of recovery such as a reduction in fuel flow as dictated by the engine control system 22 and/or an increase in compressor bleed. The engine control system 22 can simply output control signals to the fuel controller 23 to reduce fuel flow from the fuel controller 23 and/or to a bleed valve actuator 29 to increase bleed air. Generally, the amount of compressor bleed will be less due to the staging of the nozzles. Staging creates a non-uniform back pressure which allows the compressor to recover from a stall condition.

The location of the valves is not critical. Any placement which prohibits fuel from being delivered to selected ones of the nozzles is sufficient, although the two manifold system is preferable for its simplicity. It is possible to place the valves in the nozzles themselves. Moreover, numerous types of valve actuators can be used, such as pneumatic or hydraulic actuators, in addition to numerous types of electrically actuated valves such as solenoid actuator. In the schematic view of FIG. 4, the line 40 could represent a fluid pressure line for a mechanical, pressurized fluid-operated valve, and the control signal 42 would be provided to control a source of pressurized fluid, such as pressurized air or hydraulic fluid.

The nozzles may also be stayed in groups, for example, groups of three nozzles can be interconnected to one manifold and every other group of three nozzles can be interconnected to the other manifold. Moreover, as few as every fifth nozzle can be cut-off from fuel, while as many as ⅔ of the nozzle can remain fueled, with the resulting drop in back-pressure being sufficient to effect stall recovery.

Numerous modifications and adaptations of the present invention will be apparent to those so skilled in the art and thus, it is intended by the following claims to cover all such modifications and adaptations which fall within the true spirit and scope of the invention.

What is claimed is:

1. A compressor stall recovery apparatus for a gas turbine engine having a combustor downstream of the compressor, the combustor having a plurality of nozzles disposed in an annular array around an axis of the gas turbine engine, the apparatus comprising:

a first manifold interconnecting a portion of the plurality of nozzles;

a second manifold interconnecting a remaining portion of the plurality of nozzles;

valve means for regulating the flow of fuel to the first and second manifolds;

means for detecting a compressor stall condition; and control means operable in response to the detecting means, for controlling the valve means to block the flow of fuel to one of the first and second manifolds when the detecting means detects a compressor stall condition.

2. A compressor stall recovery apparatus according to claim 1, wherein every other one of the nozzles is connected to the first manifold and the remaining nozzles are connected to the second manifold.

3. A compressor stall recovery apparatus according to claim 1, wherein the control means includes means for automatically outputting a control signal to actuate the valve means upon detection of a compressor stall condition.

4. A compressor stall recovery apparatus according to claim 1, wherein the control means comprises a manual switch.

5. A compressor stall recovery apparatus according to claim 1, further comprising bleed valve actuator means, coupled to the control means, for increasing the amount of bleed air from the compressor upon detection of a compressor stall condition.

6. A compressor stall recovery apparatus according to claim 1, further comprising fuel control means coupled to the control means for cutting back the fuel supply rate upon detection of a compressor stall condition.

7. A compressor stall recovery apparatus according to claim 1, wherein the valve means comprises a valve disposed in a fuel line, the valve being normally in a position to supply fuel to both the first and second manifolds, and being operable to move to a nozzle staging position in response to a control signal issued by the control means upon detection of a stall condition so as to block the flow of fuel to one of the first and second manifolds.

* * * * *